UNITED STATES PATENT OFFICE.

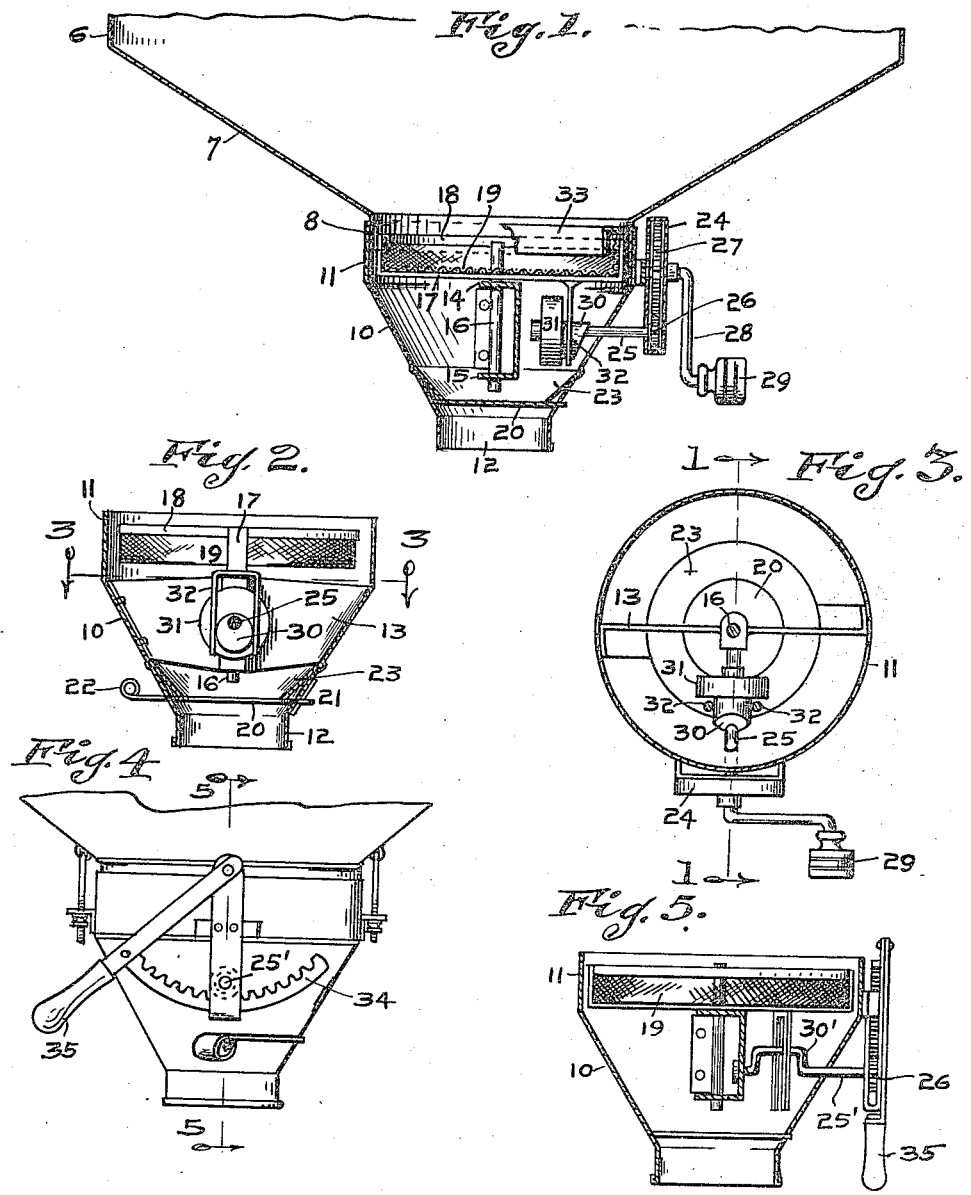

HARRY A. HALL, OF NEWCASTLE, INDIANA, ASSIGNOR TO THE HOOSIER MANUFACTURING COMPANY, OF NEWCASTLE, INDIANA, A CORPORATION OF INDIANA.

SIFTER FOR FLOUR-BINS.

1,075,474.              Specification of Letters Patent.      Patented Oct. 14, 1913.

Application filed June 2, 1913. Serial No. 771,350.

*To all whom it may concern:*

Be it known that I, HARRY A. HALL, a citizen of the United States, residing at Newcastle, in the county of Henry and State of Indiana, have invented certain new and useful Improvements in Sifters for Flour-Bins, of which the following is a specification.

This invention relates to flour sifters which are particularly applicable for use for sifting flour for domestic purposes in kitchen cabinets, and the like. The prevailing structure for this purpose, heretofore, has been a hemispherical wire sieve within which suitably curved stirring wires have been rotated. In this construction the wire reel is likely to grind up any foreign substance or flour lumps and force them through the sieve.

The object of this invention is to provide a reversible rotary sifter wherein the motion of the wire screen sifts the flour instead of the flour being ground through the sieve wire by the action of a wire reel as heretofore and consequently any foreign substance which is too large to go through the sieve will remain in the basket until the flour bin is empty when the sifter basket can be removed for cleaning.

A further object of the invention is to provide a removable sifter basket and also to greatly increase the operative speed of the sifter.

A further object is to prevent the unsifted flour from working down from the outside of the sieve basket and to compel all of the flour to go through the sieve basket to be sifted.

Another object of the invention is to provide a simple, inexpensive and durable sifting device which is adapted to be readily attached to and removed from the flour bin.

I accomplish the above objects by the mechanism illustrated in the accompanying drawing, in which—

Figure 1 is a vertical section of the lower end of a flour bin with my improved sifting mechanism applied in operative position thereto, the section being on the line 1—1 of Fig. 3. Fig. 2 is a section at right angles to that of Fig. 1 showing the yoke and eccentric wheel mechanism. Fig. 3 is a transverse horizontal section on the line 3—3 of Fig. 2. Fig. 4 is an elevation of the lower end of the flour bin with a modified form of my invention applied to the bin, and Fig. 5 is a vertical section of this modified structure on the line 5—5 of Fig. 4.

Like characters of reference indicate like parts throughout the several views of the drawing.

A flour bin 6 of any usual size and form is provided with a hopper 7 which terminates with an annular vertical flange 8 around its discharge opening.

10 is the body of the sifter, of usual form, within which my improved mechanism is assembled. This body is here shown as funnel shaped and provided with a vertical flange 11 which makes a close sliding fit outside of the flange 8. The flange 11 will be secured to the hopper 7 in a removable manner by any of the usual and suitable means. The reduced discharge opening at the lower end of the funnel-body 10 is surrounded by a vertical flange-ring 12.

Secured to the inner walls of the body 10 and extending diametrically across the latter is a plate 13, portions of which are formed and bent to form horizontal flanges 14 and 15, located at the upper and lower edges, respectively, of the plate 13. These flanges are perforated to receive a vertical shaft 16 and form the journals for said shaft. Secured near the upper end of the shaft 16 is a horizontal bar 17, the outer ends of which are turned up at right angles and support a metal ring 18. Depending from and supported by the metal ring 18, and also by the bar 17 is a woven wire sieve-basket 19, the bottom of which will preferably be substantially flat and the sides vertical and at right angles to said bottom. The sieve-basket 19 will rotate with the shaft 16 when the latter is rocked.

Located between the lower end of the shaft 16 and the flange 12 is a damper-plate 20 which is hinged at 21 and has an opposite projecting portion 22. This damper-plate is adapted to be moved horizontally in and out of the body 10 to open and close the discharge through the bottom of said sifter body. Leakage through the slot in the body 10 through which the damper-plate is operated, is prevented by a funnel shaped flange 23 located above the plate within the body 10, as shown.

Supported from the flange 11, outside of the sifter body is a gear case 24, and supported by the gear case and by the body 10 is a horizontal shaft 25 which terminates within the gear case and has mounted on that end of it a pinion 26, the teeth of which are in mesh with a larger spur gear wheel 27, also mounted in said gear case on a shaft which is continued outside of the gear case and is bent to form a crank 28 terminating with a handle 29.

Mounted eccentrically upon the shaft 25, within the body 10 is a wheel 30 which is preferably integral with a concentric wheel 31. The wheel 31 acts as a fly wheel for the gear mechanism.

Supported by and depending from the horizontal sieve bar 17 is a yoke 32, the two members of which straddle the eccentric wheel 30 with the result that when the latter is rotated an oscillatory movement will be imparted to the bar 17 thereby vibrating the sieve-basket and oscillating the shaft 16.

Secured to the flange 8 of the hopper 7 within the flange, and above the sieve-basket is a feeding ring 33 which comes down over the basket so no unsifted flour can work down on the outside of the basket.

By the mechanism thus far described by the application of a continuous rotary power applied to the handle 29, a reversible rotary motion will be imparted to the sieve-basket 19, and the flour will be sifted through the sieve but all large and undesirable substances will be retained in the basket, and when the bin is empty the body 16 can be readily removed, and the sieve-basket lifted out and emptied.

In the modification shown in Figs. 4 and 5, the shaft 25' is formed with a crank 30' instead of having the eccentrically mounted wheel 30, and the pinion 26 on the outer end of the shaft 25' is rotated by means of a segmental rack 34 having a handle 35 by which it is oscillated. The construction otherwise is the same as for the device illustrated in Figs. 1 to 3 inclusive, and the operation will be understood without further description.

While I have described my invention with more or less minuteness as regards details of construction and arrangement, and as being embodied in certain precise forms, I do not desire to be limited thereto unduly or any more than is pointed out in the claims. On the contrary, I contemplate all proper changes in form, construction and arrangement, the omission of immaterial elements, and the substitution of equivalents as circumstances may suggest or necessity render expedient.

I claim:

1. The combination with a flour bin having a bottom outlet and a hopper leading thereto, of a sifter-body removably secured to the bin, a shaft-holder mounted in the sifter-body, a sieve-basket, a shaft on which the sieve-basket is mounted, said shaft being removably secured in said holder, a hand crank, and means operated by the crank for oscillating said sieve-basket.

2. The combination with a flour bin having a bottom outlet and a hopper leading thereto, of a sifter-body removably secured to the bin, a plate within the sifter-body extending diametrically thereof, shaft supporting means on said plate, a circular sieve-basket, a vertical shaft concentrically of the basket to which the basket is secured, said shaft being supported by the shaft supporting means of said plate, a hand crank, and means operated by the crank for oscillating said sieve-basket.

3. The combination with a flour bin having a bottom outlet and a hopper leading thereto, of a sifter-body removably secured to the bin, a sieve-basket removably mounted within the sifter body, a yoke depending from the sieve-basket, a hand crank, a second crank passing through the yoke and having means to contact with the yoke to oscillate the sieve-basket when the shaft is rotated and a gear means connecting the last shaft with the crank shaft.

4. The combination with a flour bin having a bottom outlet and a hopper leading thereto, of a sifter-body secured to the bin, a sieve-basket mounted within the sifter-body, a yoke depending from the sieve-basket, a horizontal shaft passing through the yoke, means on the shaft to contact with the yoke and oscillate the sieve-basket when the shaft is rotated, a second shaft having a hand crank and gear means between the two shafts.

5. The combination with a flour bin having a bottom outlet and a hopper leading thereto, of a sifter-body removably secured to the bin, a vertical shaft removably secured within the sifter-body, a circular sieve-basket supported by said shaft, a yoke depending from the sieve-basket, a shaft passing through the yoke and having an eccentric wheel between the members of the yoke, a hand crank shaft and gears connecting the hand crank shaft with the shaft which passes through the yoke.

In witness whereof, I have hereunto set my hand and seal at Newcastle, Indiana, this, 24th day of May, A. D. one thousand nine hundred and thirteen.

HARRY A. HALL. [L. S.]

Witnesses:
C. E. LAMB,
J. WILKES CRIM.